United States Patent

Ohnsorge et al.

[15] 3,683,278

[45] Aug. 8, 1972

[54] METHOD FOR DETECTING INTERFERENCE IN FREQUENCY SHIFT DATA TRANSMISSION SYSTEMS

[72] Inventors: Horst Ohnsorge, Erstetten; Winfried Wagner, Ulm/Danube, both of Germany

[73] Assignee: Telefunken Palenlverwerlungsgesellschaft m.b.h., Ulm/Danube, Germany

[22] Filed: April 11, 1969

[21] Appl. No.: 815,458

[30] Foreign Application Priority Data

April 11, 1968 Germany..........P 17 62 117.9

[52] U.S. Cl.......................325/42, 325/30, 325/163, 325/320

[51] Int. Cl..............................................G01d 1/16

[58] Field of Search......325/41, 42, 163, 30, 65, 320; 178/66

[56] References Cited

UNITED STATES PATENTS

| | | | |
|---|---|---|---|
| 3,551,889 | 12/1970 | Miller | 325/320 |
| 3,353,102 | 11/1967 | Meyers et al. | 325/30 |
| 3,325,595 | 6/1967 | Dascotte | 325/163 |

*Primary Examiner*—John W. Caldwell
*Assistant Examiner*—Marshall M. Curtis
*Attorney*—Spencer & Kaye

[57] ABSTRACT

A method for detecting interference in data transmission systems of the type in which binary signals are sent by transmitting a signal of one frequency to indicate a zero and of another frequency to indicate a one, and which signals are, upon receipt, filtered to separate the frequencies, rectified, and supplied to threshold circuits to determine the presence of a desired binary signal, including the steps of supplying to threshold circuits a voltage which includes the sum of the output voltages of the separate rectified binary signals, and passing that sum signal to threshold value circuits to determine whether the sum is in the range between two threshold voltages, within which range the sum voltage would lie during undistorted reception.

3 Claims, 12 Drawing Figures

INVENTORS

Horst Ohnsorge &
Winfried Wagner

BY Spencer & Kaye

ATTORNEYS

INVENTORS
Horst Ohnsorge &
Winfried Wagner

BY Spencer & Kaye
ATTORNEYS

INVENTORS
Horst Ohnsorge &
Winfried Wagner
BY Spencer & Kaye
ATTORNEYS

METHOD FOR DETECTING INTERFERENCE IN FREQUENCY SHIFT DATA TRANSMISSION SYSTEMS

BACKGROUND OF THE INVENTION

This invention relates to a method of detecting interference, and more particularly to a method for detecting interference in data transmission systems of the type in which binary signals are transmitted over telephone or other communication lines by sending signals of one frequency to indicate one binary quantity, or state, and signals of another frequency to indicate the other binary quantity, or state.

In systems in which binary data is transmitted over public telephone lines it is advantageous to use interference detectors in addition to the detectors which determine whether the signals received indicate one or the other binary quantity. The interference-detecting system monitors the signals arriving over the transmission channel and gives a warning of the presence of interference of the type which might appear to indicate a binary character to the signal detection system and thus might lead to the recording of erroneous data.

Such signals are often sent as successive tones of two different pitches, a tone of low pitch perhaps representing a "zero" and a tone of high pitch representing a "one". With faster keying rates the signal lose their significance as audible tones of particular pitch, and it is more accurate to refer to the sending and receiving apparatus as frequency modulators and demodulators, respectively, and the modulation process as binary frequency keying. When a positive input voltage is supplied to the modulator at the sending end, a sinusoidal voltage of a higher frequency is emitted, and when a negative input voltage is supplied, a sinusoidal voltage of a lower frequency is emitted. Typical values of the frequencies are 2100 Hz and 1300 Hz for the main information channel and 450 Hz and 390 Hz for an auxiliary channel often used for return notification. The main channel can be keyed up to 1200 times per second and the auxiliary channel can be keyed up to 75 times per second. These channel values are defined by the CCITT recommendation V 23 on FM modems for data transmission.

Particularly at the faster speeds, erroneous readings may be produced by the detection equipment. Random signals may be confused with information signals since the signals representative of one binary quantity are of such short duration as to hardly represent a full pulse. Interference detectors have been provided to give some indication of the presence of such erroneous signals. This permits corrective action, as for example, the retransmission of the desired signal. Where efforts have been made to detect interference before demodulation, it has been found that the correlation with the actual resulting errors has not been sufficiently high. Either the recognition capability is too low or, with more sensitive detectors, the redundance (unnecessary error indication) is too high. A significant improvement has been made in detecting interference after demodulation, as is disclosed, for example, in German Published Patent Application (DAS) No. 1,208,332.

In this known arrangement the high-frequency signal $f_1$ and the low-frequency signal $f_2$ are each supplied to a respective one of two bandpass filters, one of which is sensitive to the high frequency and the other to the low frequency. The output of these two filters is rectified and appears as some particular voltage $v_1$ or $v_2$ at the output of the respective rectifier. In the ideal case, when the signal $f_1$ is transmitted, voltage $v_1$ equals some particular selected voltage $v_1$, and the voltage $v_2$ has the value 0. Likewise in the ideal case, when signal $f_2$ is received, $v_1$ has the value 0 and voltage $v_2$ has some preselected value $v_2$. The difference $v_1 - v_2$ is positive when $f_1$ is received and negative when $f_2$ is received. In this known arrangement the difference $v_1 - v_2$ is used to determine the presence or absence of interference. This difference $v_1 - v_2$ is positive when $f_1$ is received and negative when $f_2$ is received.

For reasons which will be discussed in connection with the detailed description of the preferred embodiment and of the graphs shown in the drawings hereafter described, this arrangement is not as sensitive as is the arrangement of the present invention and consequently either a slower keying rate must be used or the interference indicator must be set to reject some potentially readable signals in order to ensure that all erroneous signals are rejected.

SUMMARY OF THE INVENTION

Among the objects of the present invention is the provision of an interference detection system usable with binary data transmission systems, which permits a higher keying rate.

A further object of the present invention is the provision of such a system which is more sensitive to the presence of interference, and in which signals which might, for the sake of accuracy, have to be rejected in prior art systems, may be intelligibly read.

A further object of the present invention is the provision of such a system in which signals can be accurately read despite the presence of higher levels of interference.

Briefly stated, these and other objects are accomplished by the utilization of a method for detecting interference in data transmission systems in which binary signals are sent by the transmission of a signal of one frequency to indicate a "zero" and a signal of another frequency to indicate a "one", and upon receipt are directed to two bandpass filters each of which passes signals of one of said frequencies, the output of each filter being rectified and supplied to threshold value circuits to determine the presence or absence of a desired signal. A sum voltage $v_s = a \cdot v_1 + b \cdot v_2\ v_c$ is used. In this equation, $v_1$ and $v_2$ represent the output of the respective rectifiers connected to each of the bandpass filters and a and b are such that during reception $a \cdot v_1 = b \cdot v_2$, when $v_1 = V_1$ and $v_2 = v_2$, i.e., for reception of each binary value. $V_1$ and $V_2$ are the full voltage output of the bandpass filters and their rectifiers under ideal conditions. The value of the voltage $V_c$ is such that a favorable operating range results for the threshold value circuits. Sum voltage signals which are outside the range between two threshold voltages are passed through the threshold value circuits. Such signals as are passed serve as an indication of the presence of interference. The range between the two threshold voltages contains the value of the sum voltage which occurs during undistorted reception, and the threshold voltages are such as to define a range in which the sum voltage must lie for undistorted reception.

BRIEF DESCRIPTION OF THE DRAWINGS

FIGS. 2*a* and 2 *b* are a pair of related graphs, similar to those of FIG. 1, showing the binary signal output voltages which are regarded as usable in accordance with one prior art method of defecting interference.

Figure 5:
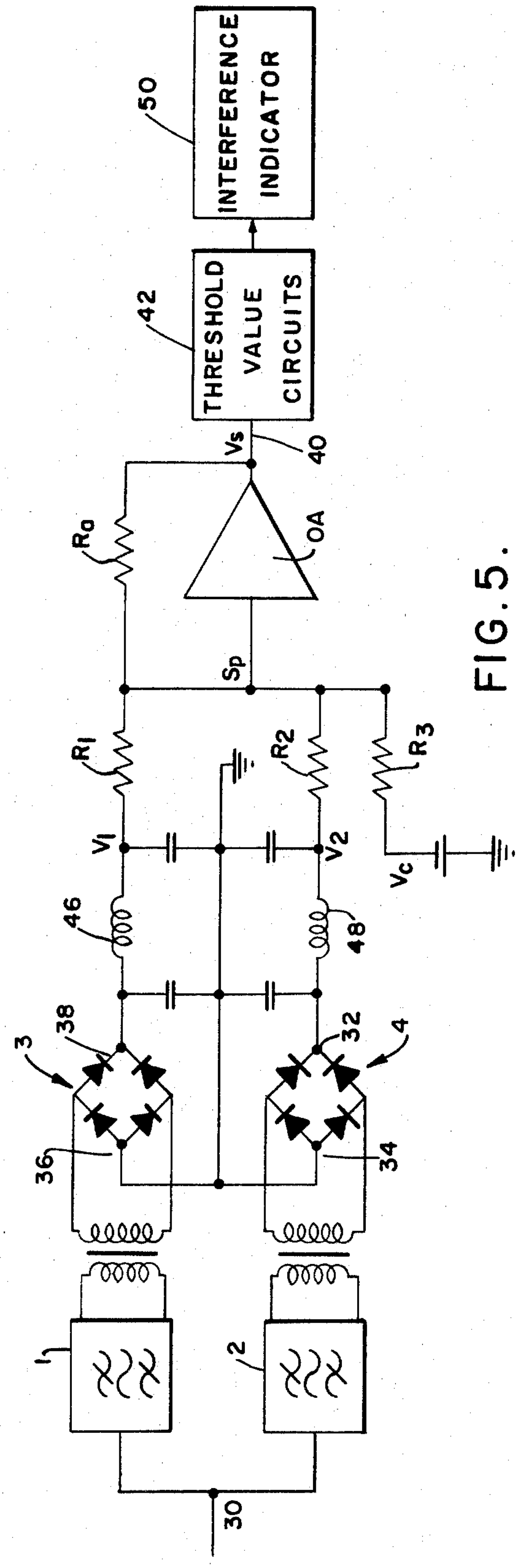
FIG. 5 is a schematic representation of a circuit utilizing the method of the present invention.
Figure 7:
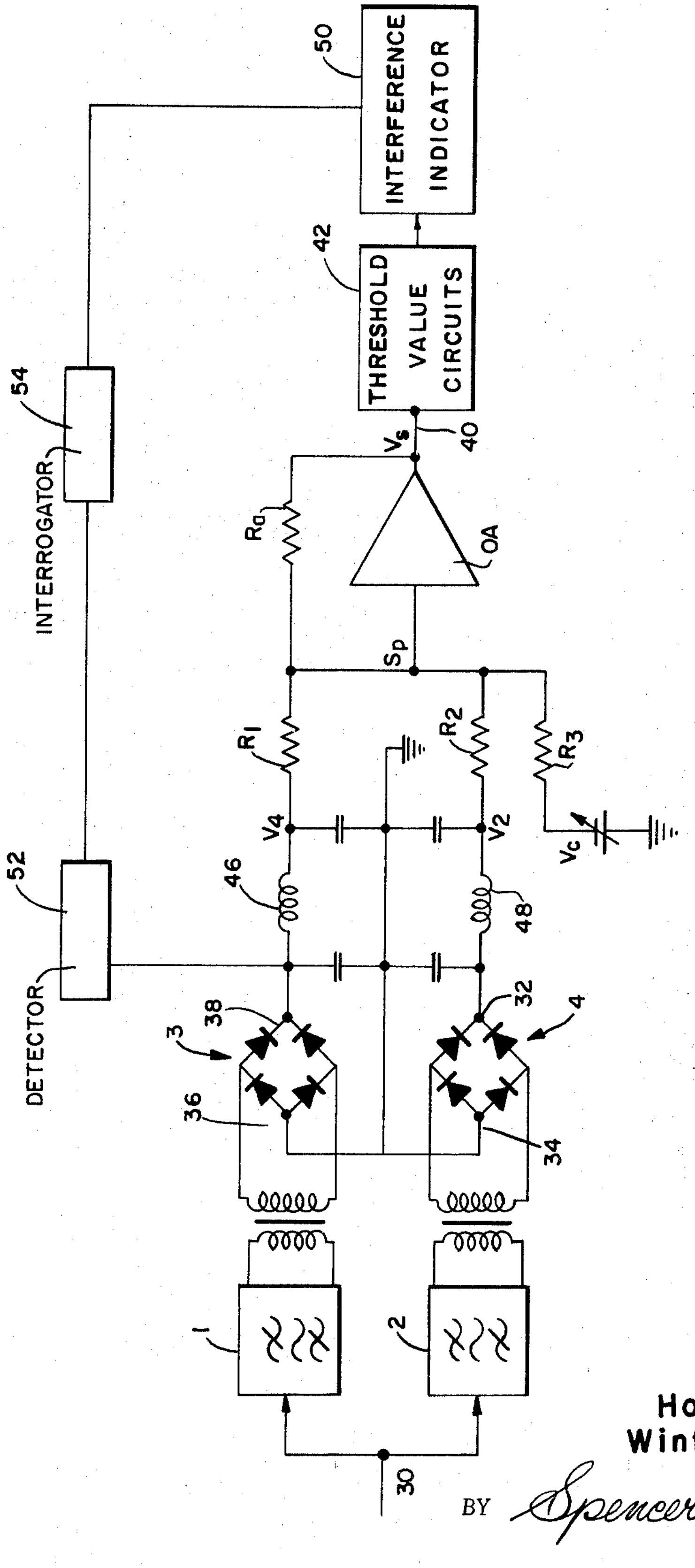
FIG. 7 is a schematic representation of another circuit utilizing another embodiment of the method of the present invention.

The circuits of FIG. 5 and 7 are only drawn for interference detection. To recognize the transmitted signal, it is necessary to form the difference $v_1-v_2 = v_{tr}$. The circuits to recognize the transmitted signals are not drawn because they are not within the scope of the invention.

DESCRIPTION OF THE PREFERRED EMBODIMENTS

Before proceeding to a discussion in detail of the method of the present invention it will be advantageous to discuss the interference detection problem involved in binary data transmission systems of the type with which the present invention will be utilized, by referring to FIGS, 1, 2 and 3.

Figures 1A, 1B:
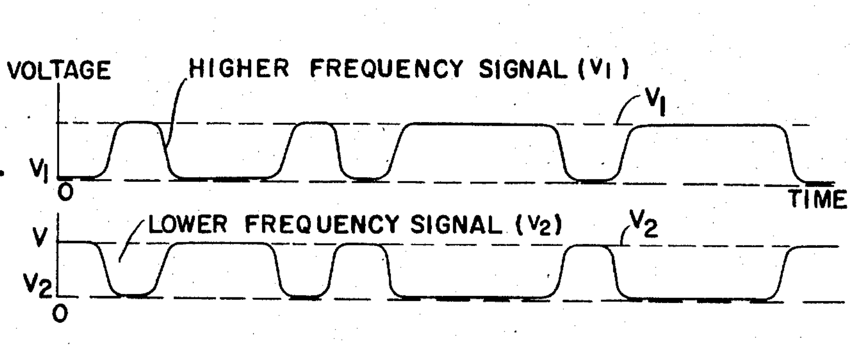
FIGS. 1*a* and 1*b* are a pair of related graphs showing voltage plotted against time for signals carrying the binary code representations of "one" and "zero", as they appear after recification in data transmission systems of the type with which the method of the present invention will be utilized.

Referring now to FIG. 1 the actual variations with time of the voltage $v_1$ of the higher frequency signal is shown in FIG. 1*a* as it appears in the ideal case after rectification. FIG. 1*b* shows the variations of the voltage of the lower frequency signal $v_2$ occurring at the same time. The time scales of FIGS. 1*a* and 1*b* are identical and points on the curve of the lower frequency voltage signal $v_2$ are located directly below points showing voltages of the higher frequency signal $v_1$ occurring at the same time. These curves show that in the ideal case when no signal is being transmitted on the higher frequency and the output voltage $v_1$ obtained after rectification is zero, an alternating frequency is being transmitted on the lower frequency channel and a non-zero output voltage $v_2$ is being delivered from the associated rectifier. The sign of this non-zero voltage whether negative or positive depends on the rectification arrangement. In the case illustrated in FIG. 1 the rectifiers are arranged to produce a positive voltage.

In the ideal situation illustrated in FIGS. 1*a* and 1*b* the actual voltages $v_1$ and $v_2$ reach the full voltage values $V_1$ or $V_2$ which the apparatus is designed to transmit.

The presence of interference has the result that the two frequency signals are no longer received in the manner illustrated in which the voltage signals received on each frequency cancel each other.

The output signals of filter 1 or 2 can be erased by the distortions, or a signal is simulated, e.g., by noise, while there is no signal transmitted. In both cases the decision of the detector for the transmitted signal is wrong. These cases are detected by the interference detector following the invention, for it detects all deviation from the signal levels V and O, respectively, whereas the detector for the transmitted signal decides as long as the output level of filter 1 or 2 is unequal to O. This decision is impossible, however, if the output levels of both filters are equal.

Interference detectors always attempt to narrow the decision range of the actual decision circuit, i.e., to set closer tolerances for the signal for which the decision is made. Accordingly, the amplitude of the voltage of the signal after demodulation is used as an indication of the presence or absence of interference, and the detectors may be regarded as amplitude tolerance devices.

Figures 2A, 2B:
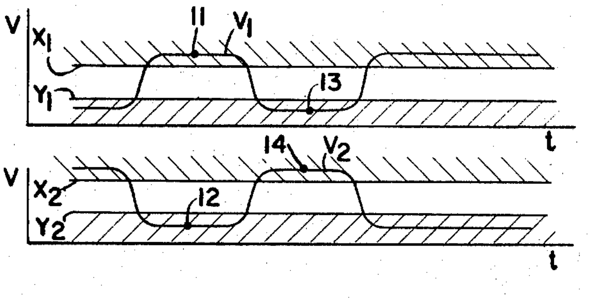
FIG. 2a. FIG. 2b. PRIOR ART

For example, as shown in FIGS. 2*a* and 2*b*, one prior art method considers a signal as not interfered with only under two conditions. The first condition is when the voltage $v_1$ of the higher frequency signal is above certain threshold level $x_1$ (as for example it is at the point designated 11) and simultaneously the voltage $v_2$ of the other signal is below a threshold level $y_2$ (as shown by point 12). The other condition is when the voltage $V_1$ is below a threshold level $y_1$ (as shown by point 13) and simultaneously the voltage $v_2$ is above a threshold level $x_2$ as shown by point 14. The sensitivity of the interference detector depends on the distance of the threshold from the zero voltage line.

Figure 3:
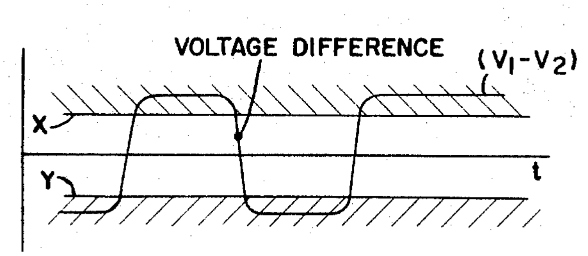
FIG. 3. PRIOR ART
FIG. 3 is a graph of voltage plotted against time of a voltage difference signal used in accordance with another prior art method of detecting interference.

The voltage difference obtained by subtracting voltage $v_2$ from voltage $v_1$ may also be used for determining the presence or absence of interference. A typical voltage vs. time curve for this quantity is illustrated in FIG. 3. In apparatus operating according to this principle only two thresholds are needed to give results equivalent to the method depicted in FIGS. 2*a* and 2*b* which uses four thresholds.

Either of the above methods give unsatisfactory results when linear distortions occur either in the channel or in the receiver filters. These types of distortions occur when the permissible upper keying frequency of 1200 bauds (bits/sec.) is approached.

Figures 4A, 4B, 4C:
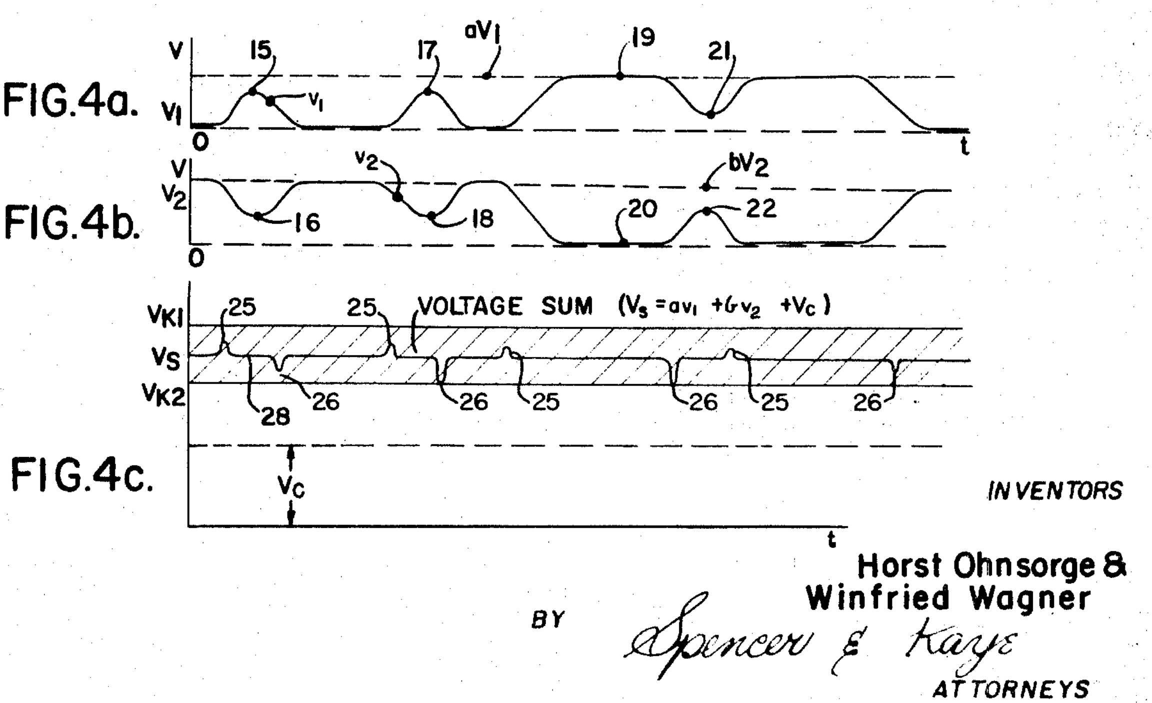
FIGS. 4*a*, 4*b* and 4*c* are a set of three related graphs showing voltage plotted against time, FIG. 4*a* showing the voltage of one binary signal, FIG. 4*b* showing the voltage variations of the other binary signal, and FIG. 4*c* showing a voltage sum signal utilized for the detection of interference in accordance with the method of the present invention.

One illustration of a situation which might result in the rejection of signals which are intelligible by existing apparatus is illustrated in FIGS. 4*a* and 4*b*. Thus, at point 15 voltage $v_1$ has failed to reach the maximum voltage $V_1$ and at the same time at point 16 voltage $v_2$ is not at zero. Under either of the prior art methods interference would be indicated and the signal would be rejected. At point 17 voltage $V_1$ and at point 18 voltage $v_2$ have values similar to those at points 15 and 16, respectively: and another intelligible signal is rejected. At point 19 voltage $v_1$ has reached its maximum value *a* $v_1$ and at point 20 voltage $v_2$ is at zero, so in this case a signal is transmitted. At point 21 voltage $v_1$ has not reached the value zero and voltage $v_2$ has not reached its desired voltage *b* $V_2$ at point 22 so again at potentially significant signal is rejected. Accordingly, in the example shown in FIGS. 4*a* and 4*b* a number of potentially intelligible signals have been rejected and it will be necessary to both repeat the transmission of this data and to slow down the sending rate or take other appropriate action to avoid similar signal rejection during the retransmission of the data.

However, as shown in FIG. 4c a voltage sum formed by adding the voltages $v_1$ and $v_2$ at any given instant produces a relatively straight line. The only deviations which will be noted will be peaks such as 25 and 26 which occur at the beginnings and the ends of corresponding voltage pulses in the respective frequency channels.

From inspection of FIGS. 4a, 4b and 4c it may be appreciated that if voltage variations in the signal of the higher frequency line are accompanied by corresponding variations in the voltage of the signals sent at the other frequency, this is a good indication that these particular voltage changes are caused by the transmission of a binary signal. Accordingly, the voltage distortions caused by linear distortions are in the receiver filters or by the sending of relatively short pulses which might make it possible to reach the threshold levels $x$ and $y$ illustrated in FIG. 3 or to go over or under the thresholds $x_1$, $y_1$ or $x_2$, $y_2$ of FIG. 2 may be used. Accordingly, by determining whether this sum voltage moves out of the range shown by cross hatching in FIG. 4c between upper and lower thresholds $V_{k1}$ and $V_{k2}$, respectively, only that interference which moves the sum voltage out of this range can be regarded as an indication of dangerous interference. This would be interference, for example, of the type which shows up as a variation of the voltage of one signal without a corresponding variation in the opposite direction of the other signal.

It will also be appreciated that this desired range between upper and lower thresholds $V_{k1}$ and $V_{k2}$ can be caused to occur in any desired voltage range which is convenient for the particular threshold determining apparatus by adding some particular constant correction voltage $v_c$. As used in this specification and the attached claims, $V_c$ means any constant voltage of predetermined value. This value could be either positive or negative, or for that matter even zero.

From inspection of FIG. 4c, and from what has been said before it will be noted that the chief variations from linearity of the voltage sum signal $V_s$ occur at points such as 25 and 26 at the beginning or end of the transmission of a binary signal. The effect of peaks occuring at these times can be eliminated by operating an interrogation device only at a time when the binary signal is also being interrogated. This is during the midpoint of the transmission of each bit at which time the sum voltage will be in its linear range as illustrated at point 28. Use of such a method also permits placing of threshold levels $V_{k1}$ and $V_{k2}$ at a point considerably closer to the ideal value of the sum voltage so that the detector becomes more sensitive.

In the case of modems and channels leading to a symmetrical signal behind the the frequency discriminator, thresholds $V_{k1}$ and $V_{k1}$ are advantageously located symmetrically about the mean value of the sum voltage which occurs during clear reception. In this case threshold can be realized with only one comparator K (see FIG. 6a).

Figure 6B:
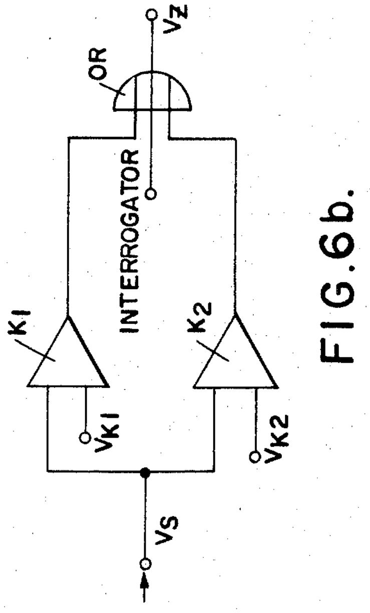
FIGS. 6*a* and 6*b* respectively, show a threshold value circuit and an interference indicator.

In many cases, however, channels and modems produce unsymmetrical signals. Therefore two independent thresholds, realized by two comparators ($K_1$, $K_2$), are necessary (FIG. 6b).

The voltage sum $V_2 = a\ v_1 + b\ v_2 + V_c$ given to the threshold value circuit consists of the voltage $v_1$ (FIG. 1a) and $v_2$ (FIG. 1b) rated with the factors $a$ and $b$ respectively, and the voltage $V_c$ which is delivered from a variable source. By adjusting $V_c$, voltage sum $V_s$ is situated in the center of the threshold levels $V_{k1}$ and $V_{k1}$ (FIG. 4c).

If a $v_1 = b\ v_2$, the undisturbed transmission is characterized by a $v_1 + b\ v_2 = \text{const}$. In this way the linear distortions of the modems and channels are eliminated, as the phases of $v_1$ and $v_2$ are complementary at the output of the frequency discriminator. Therefore, the threshold levels can be situated very closely to the voltage sum $V_s$, whereby a very sensitive interference detection is reached.

In the ideal case, only the superimposed interference voltage s remains as voltage sum; in other words, the signals represented by the voltages $v_1$ and $v_2$ are completely suppressed (then $V_s = V_c + s$).

A possible realization of the factors a and b is discussed below.

By virtue of the above explanation of the theoretical basis of the method it will be evident that a method has been provided which detects interference which changes the output voltages of one of the two signals without causing corresponding changes in the other signal.

Once the method of this invention, which involves using the sum voltage as part of the interference detector, has been disclosed, the necessary apparatus can be designed in a straightforward manner by those skilled in the art. In the case of the arrangement disclosed in the German Published Patent Application No. 1,208,332 only the polarities of the connections of one of the rectifier arrangements need be changed so as to make the interference detector work on the basis of utilizing the sum of the voltages $V_s = v_1 + v_2$ instead of the difference voltage $v_d = v_1 - v_2$.

One type of apparatus which might be used for the practice of this invention is disclosed in FIG. 5. There a binary data carrier signal 30 which may contain binary characters indicated by a superimposed alternating frequency signal $f_1$ of a higher frequency or $f_2$ of a lower frequency is fed to bandpass filters 1 and 2. Bandpass filter 1 is sensitive to frequency $f_1$ and bandpass frequency filter 2 passes signals of frequency $f_2$. The bandpass filters 1 and 2 are well known LC filters, as described e.g., in Meinke-Gundlach, Taschenbuch der Hochfrequenztechnik, Springer-Verlag 1956, S. 147.

The alternating frequency signal delivered from bandpass filter 1 is rectified by a full-wave rectifier 3, and that delivered by bandpass filter 2 is rectified by full-wave rectifier 4. One voltage output terminal 34 of the full-wave rectifier 4 and one voltage output terminal 36 of the full-wave rectifier 3 are connected to a point of reference potential, illustrated as ground. One terminal of a voltage source $V_c$, which has a value selected so threshold value circuits hereinafter described will operate in a desired range, is also connected to the point of reference potential. The other output terminal 38 of the full-wave rectifier 3 is connected, via a filter element 46, to one end of a resistor $R_1$. The other output connected, 32 of the full-wave rectifier 4 is connected, via a filter element 48, to one end of a resistor $R_2$. The ungrounded terminal of the voltage source $V_c$ is connected to one end of a resistor $R_3$. The resistors $R_1$, $R_2$ and $R_3$ are connected on their opposite ends to the summing point Sp of an operational amplifier OA which is fed back from its output to its summing point with a resistor $R_a$. The output voltage of the amplifier OA is the sum voltage $V_s$ and is defined by $V_s = v_1 \cdot R_a/R_1 + v_2 R_a/R_2 + v_2 R_a/R_3$, where $v_1$ and $v_2$ are the voltage at the filter elements 46 and 48, respectively. Thus the above mentioned factors a, b are given by the ratios $a = R_a/R_1$ and $b = R_a.R_2$, while the value of resistor $R_3$ is unsignificant. The output voltage $V_s$ is led to threshold value circuit 42, which will be described below (FIG. 6). The output of threshold value circuit 42 is delivered to an interference indicator circuit 50, the function of which will be described in FIG. 6, too.

Figure 6A:
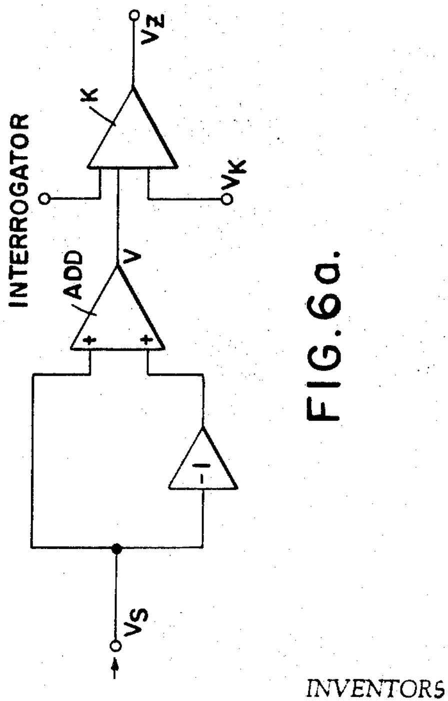

FIG. 6*a* shows a threshold value circuit having symmetrical thresholds. It consists of a negator which is followed by an adder (ADD), whereby the voltage $V_s$ is given in one way directly and in the second way after negation to the adder. The output V of the adder (ADD) is one input signal of a comparator K, the second input signal $V_K$of which determines the threshold values. The output $V_z$ of the comparator is 0 if $V < V_K$, and 1, if $V > V_K$. In the center of the received signal, the interrogator gives an input signal to the comparator K (FIG. 6*a*) or to the OR-gate (FIG. 6*b*) and only when this signal appears, the comparator or the OR-gate are in function, while in the other times their output voltage shows the value O.

Referring now to FIG. 7, a circuit will be seen which is generally similar to that of FIG. 5 and corresponding elements have corresponding numbers. In addition to the elements contained in the FIG. 5 circuit, a detector 52 is provided for determining the time of transmission of the center of binary character signals and an interrogator 54 is provided for interrogating the interference indicator circuit 50 only at such times.

It will be understood that the above description of the present invention is susceptible to various modifications, changes and adaptations.

We claim: 1. A method for detecting interference in data transmission systems in which binary signals are sent by transmitting a signal of one frequency to indicate a zero and a signal of another frequency to indicate a one, and upon receipt are directed to two bandpass filters, each of which passes signals of one of said frequencies, the output of each signal being rectified and supplied to threshold value circuits having two selected threshold voltages to determine the presence or absence of a desired signal, comprising the steps of a. supplying to such threshold value circuits a sum voltage signal $V_s = a \cdot v_1 + b \cdot v_2 + v_c$; where
   i. $v_1$ and $v_2$ are the output of the respective rectifiers connected to each of the bandpass filters; receipt
   ii. a and b are such that during undistorted reception $a \cdot V_1 = a \cdot V_2$, $V_1$ and $V_2$ being the maximum voltage output of the respective filters under ideal conditions during receipt of their respective signal; and
   iii. $V_c$ is of such a value that $V_s$ is normally between the two threshold voltages; and
b. passing said sum voltage signal through the threshold value circuits which respond whenever the sum voltage signal is outside the range between the two selected threshold voltages as an indication of the presence of interference, which range contains the value of said sum voltage which occurs during undistorted reception, and said threshold voltages being such as to define a range in which said sum voltage must lie for undistorted receoption.

2. The method as defined in claim 1 wherein said two threshold voltages are symmetrical to the mean value of the sum voltage appearing during undistorted reception in that they have values which are equally greater and less than said mean voltage.

3. The method as defined in claim 1 including the step of supplying the signal passed by said threshold circuits to an interference indicator circuit, and interrogating said interference indicator circuit to determine the presence of interference only during times which correspond to the transmission of the center of a binary signal.

* * * * *

UNITED STATES PATENT OFFICE

CERTIFICATE OF CORRECTION

Patent No. 3,683,278 Dated August 8th, 1972

Inventor(s) Horst Ohnsorge and Winfried Wagner

It is certified that error appears in the above-identified patent and that said Letters Patent are hereby corrected as shown below:

In the heading of the patent, line 8, change "Palenlverwerlungsgesellschaft" to --Patentverwertungsgesellschaft--. Column 1, line 38, after "frequencies" insert --used--. Column 4, line 28, before "certain" insert --a--; line 45, change "give" to --gives--; line 54, change "$v_1$" to --$av_1$--; line 64, after "again" change "at" to --a--. Column 5, line 61, change "$V_{k1}$" (second occurrence) to --$V_{k2}$--. Column 6, line 3, change "$V_{k1}$" to --$V_{k2}$--; change "superimposed" to --superposed-- in line 19 of Column 6. Column 6, line 67, change "connected," to --terminal--. Column 7, line 22, before "V" insert --voltage--. Column 8, line 14, after "filters;" delete "receipt"; line 19, change "signal" to --signals--.

Signed and sealed this 9th day of January 1973.

(SEAL)
Attest:

EDWARD M.FLETCHER,JR.
Attesting Officer

ROBERT GOTTSCHALK
Commissioner of Patents